(12) United States Patent
Geinzer et al.

(10) Patent No.: US 8,914,158 B2
(45) Date of Patent: Dec. 16, 2014

(54) REGULATION OF CONTRIBUTION OF SECONDARY ENERGY SOURCES TO POWER GRID

(75) Inventors: Jay Geinzer, Arlington, VA (US); J. Christopher Shelton, Arlington, VA (US); Steven Meersman, Arlington, VA (US)

(73) Assignee: AES Corporation, The, Arlington, VA (US)

( * ) Notice: Subject to any disclaimer, the term of this patent is extended or adjusted under 35 U.S.C. 154(b) by 12 days.

(21) Appl. No.: 12/722,271

(22) Filed: Mar. 11, 2010

(65) Prior Publication Data
US 2011/0221276 A1 Sep. 15, 2011

(51) Int. Cl.
*G06F 19/00* (2011.01)
*H02J 3/32* (2006.01)
*H02J 7/35* (2006.01)

(52) U.S. Cl.
CPC .... *H02J 3/32* (2013.01); *H02J 7/35* (2013.01)
USPC ............................ 700/295; 700/296; 700/297

(58) Field of Classification Search
CPC ...................................... H02J 7/35; H02J 3/32
USPC .................................................. 700/295–297
See application file for complete search history.

(56) References Cited

U.S. PATENT DOCUMENTS

| 5,923,100 | A | * | 7/1999 | Lukens et al. ................. 307/66 |
| 6,118,187 | A | | 9/2000 | Hepner et al. |
| 7,117,044 | B2 | * | 10/2006 | Kocher et al. ................. 700/34 |
| 7,130,719 | B2 | * | 10/2006 | Ehlers et al. ................. 700/276 |
| 7,418,428 | B2 | * | 8/2008 | Ehlers et al. ................. 705/63 |
| 7,516,106 | B2 | * | 4/2009 | Ehlers et al. ................. 705/412 |
| 2005/0134120 | A1 | | 6/2005 | Nguyen et al. |
| 2007/0100506 | A1 | * | 5/2007 | Teichmann ................. 700/297 |
| 2008/0084178 | A1 | * | 4/2008 | Dowd et al. ................. 320/101 |

(Continued)

FOREIGN PATENT DOCUMENTS

| CN | 102395758 A | 3/2012 |
| EP | 2396513 A1 | 12/2011 |
| EP | 2489109 A2 | 8/2012 |
| WO | 2007/104167 A1 | 9/2007 |

OTHER PUBLICATIONS

International Search Report (Form PCT/ISA/220) issued on Nov. 18, 2011 by the Korean Patent Office in corresponding International Patent Application No. PCT/US2011/000446.
Written Opinion of the International Searching Authority (Form PCT/ISA/237) issued on Nov. 18, 2011 by the Korean Patent Office in corresponding International Patent Application No. PCT/US2011/000446.

(Continued)

*Primary Examiner* — Michael D Masinick
(74) *Attorney, Agent, or Firm* — Buchanan, Ingersoll & Rooney PC

(57) ABSTRACT

An energy storage medium is combined with a secondary energy source that supplies power to an electricity distribution grid. The charge and discharge behavior of the energy storage medium is controlled so that rapid increases in the output of a secondary source of energy are absorbed by the storage system, whereas rapid decreases in the output of the secondary source are compensated by discharging stored energy onto the grid. The combined contributions of the secondary source and the energy storage system ensures a rate of change that does not exceed a defined level. Maximum and minimum output power levels for the secondary source can be established to define a normal operating range. The charging or discharging of the energy storage system is also performed when the secondary output power level exceeds or falls below the limits of the defined range.

22 Claims, 9 Drawing Sheets

(56) References Cited

U.S. PATENT DOCUMENTS

| | | |
|---|---|---|
| 2008/0143304 A1 | 6/2008 | Bose et al. |
| 2008/0212343 A1* | 9/2008 | Lasseter et al. .................. 363/39 |
| 2010/0057267 A1* | 3/2010 | Liu et al. ........................ 700/297 |
| 2010/0145533 A1* | 6/2010 | Cardinal et al. ............... 700/291 |
| 2010/0231045 A1* | 9/2010 | Collins et al. .................... 307/47 |
| 2011/0084551 A1* | 4/2011 | Johnson et al. ................. 307/24 |
| 2011/0089693 A1* | 4/2011 | Nasiri .............................. 290/44 |
| 2011/0222320 A1* | 9/2011 | Delmerico et al. .............. 363/37 |
| 2011/0282514 A1* | 11/2011 | Ropp et al. .................... 700/297 |
| 2012/0261990 A1 | 10/2012 | Collins et al. |

OTHER PUBLICATIONS

Extended Search Report from European Patent Office dated Nov. 18, 2013, issued in corresponding European Patent Application No. 11753720.9. (6 pages).

Aug. 4, 2014 Chinese Office Action issued in Chinese Patent Application No. 201180020603.2 (with English language translation).

Sep. 24, 2014 Chilean Office Action issued in Chilean Application No. 2012-02505 (with English language translation).

\* cited by examiner

REGULATION OF CONTRIBUTION OF SECONDARY ENERGY SOURCES TO POWER GRID

TECHNICAL FIELD

The present disclosure relates to the use of secondary sources to contribute electrical energy to a power distribution grid, and more specifically to regulation of the overall power supplied to the grid by such sources, as well as the instantaneous increase or decrease of such power.

BACKGROUND

Typically, a utility obtains electric power from one or more primary power generation sources, such as gas-fired, coal-fired, nuclear and/or hydroelectric power plants, for delivery to customers via a distribution grid. The power supplied by these sources is relatively constant, and can be easily regulated to meet the demands of customers while at the same time conforming to the standards for such power, such as nominal voltage and frequency levels. To supplement the power supplied by these primary sources, it is becoming more common to connect secondary sources of power, such as solar panels and windmills, to the distribution grid. Among other advantages, these secondary forms of energy are renewable, in contrast to gas, coal and nuclear sources, and may also help to reduce the emission of greenhouse gases that adversely affect climactic conditions.

When a secondary source of power is connected to the grid, the utility operator expects its contribution to be within certain levels, so that it can be adequately accounted for, and the outputs of the primary sources adjusted accordingly. Unlike the relatively stable output of primary sources, however, the amount of energy produced by secondary sources can vary over a wide range within relatively short intervals, e.g. measured in seconds. For example, the output of a solar panel varies not only in accordance with the time of day, but also as a result of meteorological events such as the sudden appearance and passing of clouds that block direct sunlight. Likewise, the output of a windmill farm is subject to instantaneous gusts and lulls in the velocity of the wind.

A sudden drop in the output of a secondary source is absorbed by the grid, and needs to be accommodated by increasing the output of one or more of the primary sources. Conversely, a sudden upward spike in the secondary output may exceed the transmission capabilities of the equipment on site, resulting in a loss of generated power until the primary source can be curtailed. These sudden changes limit the effective contribution of secondary power sources within the entire fleet of sources. The greater the number of secondary sources that are utilized, the greater the variation in supplied power, which results in reduced reliability for such sources, and/or the need for fast-response primary generating units. This latter requirement induces additional costs at the primary power plants, such as increased maintenance requirements and additional fuel costs associated with operation at a non-optimal set point.

Large swings in voltage can also exceed the distribution system's response capabilities to normal operation. Traditional power generation equipment often can not respond swiftly enough to sudden changes, and incur extra fuel and maintenance costs when attempting to do so.

SUMMARY

In accordance with disclosed embodiments of the present invention, these concerns are addressed by controlling the charge and discharge behavior of one or more energy storage systems energetically coupled to the electricity grid, such that rapid increases in the output of a secondary source of energy are absorbed by the storage system, whereas rapid decreases in the output of the secondary source are compensated by discharging stored energy onto the grid. In effect, the energy storage systems temper, or "mask", the variations in the output of the secondary source, so that the power provided to and by the grid can be reliably maintained at the appropriate level.

The charging and discharging of the energy storage system can be controlled so that the combined contributions of the secondary source and the energy storage system ensures a rate of change that does not exceed a defined level. Maximum and minimum output power levels for the secondary source can be established to define a normal operating range. The charging or discharging of the energy storage system is effected only when the secondary output power level exceeds or falls below the limits of the defined range.

A better understanding of the principles and advantages of the present invention may be gained with reference to the following detailed description and the accompanying drawings.

DETAILED DESCRIPTION

To facilitate an understanding of the principles underlying the present invention, exemplary embodiments are described hereinafter with reference to the use of a solar energy conversion device, e.g. photovoltaic panels, as the secondary source. It will be appreciated that the practical applications of the invention are not limited to this example, and that it can be employed in any environment where it is desirable to attenuate rapid swings in the output of an energy source.

Figure 1:
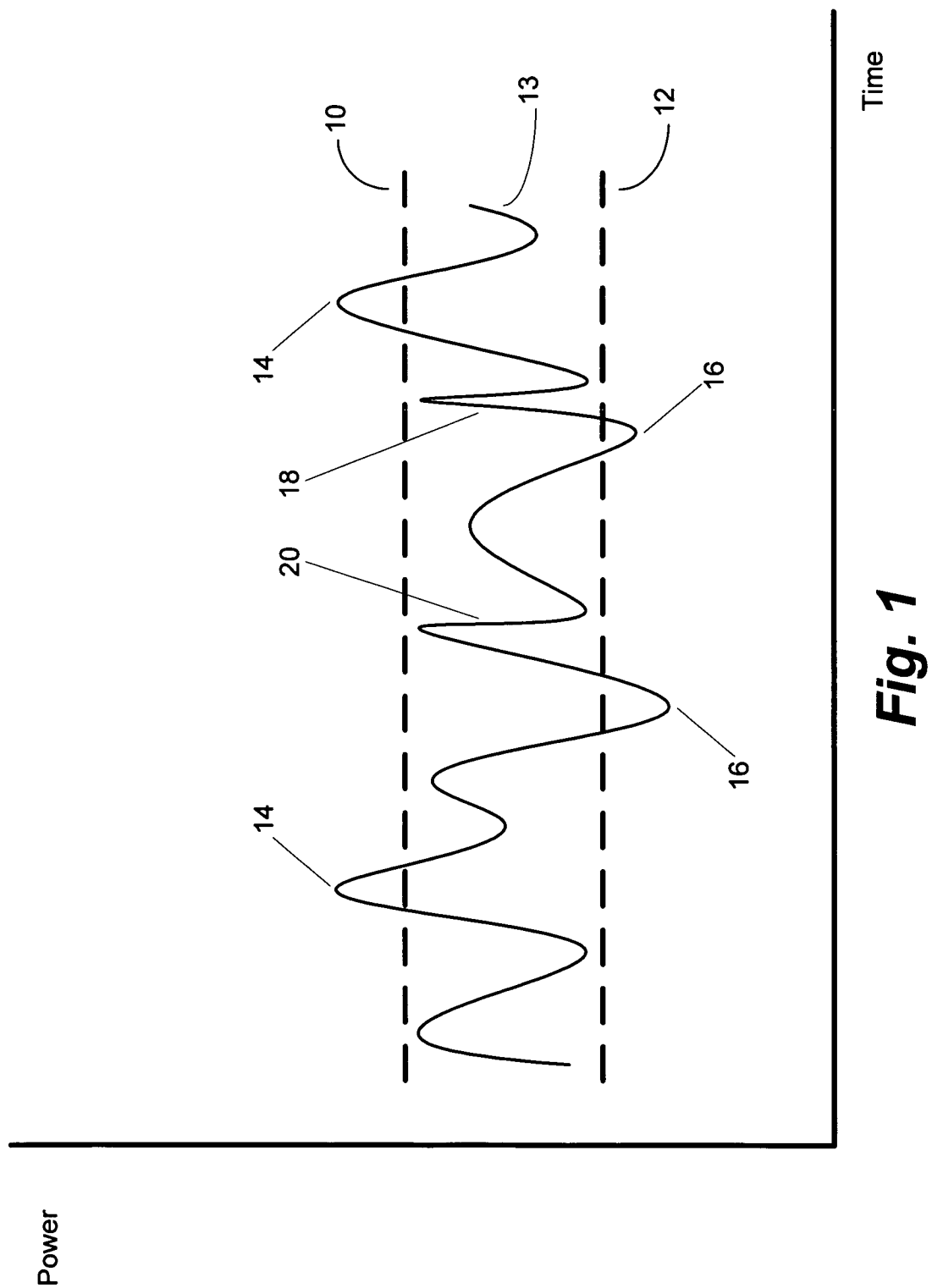
FIG. 1 is a plot illustrating the power output of a secondary energy source relative to a desired power band.

FIG. 1 is a plot of the type of situation to which the present invention applies. For a certain period of a day, e.g. a given hour, the utility operator expects a certain amount of output power from solar panels that are connected to a power distribution grid. Taking into account the ability of the grid to absorb variances, upper and lower limits 10 and 12 might be established for this time period, to define a range, or band, of acceptable output power from the solar panels. This range can vary as a function of temporal factors, such as the time of day, the day of the month and/or the month of the year, to account for changes in the position of the sun. Alternatively, or in addition, it might be a function of geographic parameters that influence the output of a secondary source, such as solar insolation, wind velocity, etc. These parameters could be based on estimates derived from historical data, or real-time measurements.

The line 13 represents the actual power levels that might be output by the solar panels during that period of time. Although the average output for that period might be within the desired band, the instantaneous value can vary widely and rapidly, resulting in peaks 14 that exceed the upper limit 10, and valleys 16 that fall below the lower limit 12. In addition, the instantaneous rate of increase 18, or rate of decrease 20, may exceed values that the grid is able to absorb, even when the actual power level is within the desired band. Since the primary power generation source(s) may not be able to react quickly enough to counter the effects of these peaks, valleys, and high rates of rise or descent, the power levels on the distribution grid may deviate from the desired level.

To alleviate the impact that such power swings can have on the distribution grid, an energy storage system is combined with the solar energy conversion device, to reduce the required response from the primary sources and subsequently incurred costs, by attenuating changes in the output of the solar panels. A drop in the output of the solar panels below the desired band is countered by releasing energy from the storage system onto the grid, and an upward rise in the output beyond the upper limit 10 is compensated by diverting some or all of the excess energy to the storage system. Moreover, when the solar panels are operating within the desired band, the storage devices can be charged or discharged to maintain the stored energy at an optimum level for absorbing the next large variation in the output of the solar panels, while at the same time attenuating any high rates of increase or decrease of the output power.

Figure 2A:
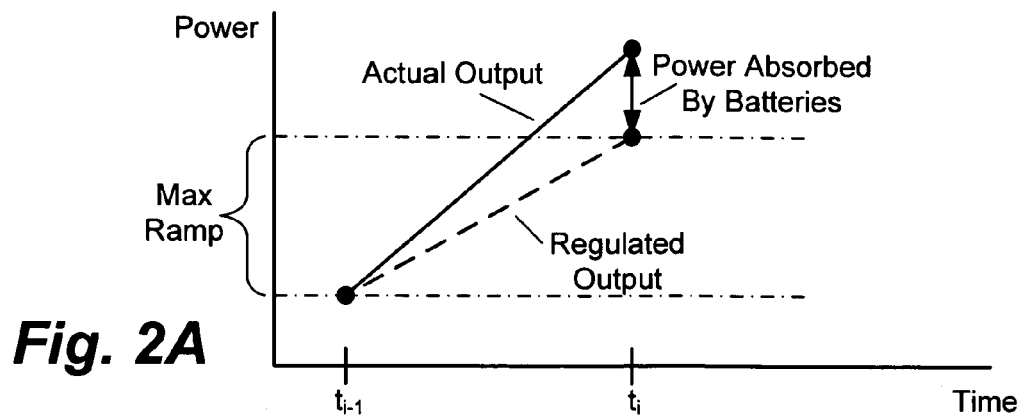
FIGS. 2A-2C are time plots illustrating the results achieved in accordance with the invention.
Figure 2B:
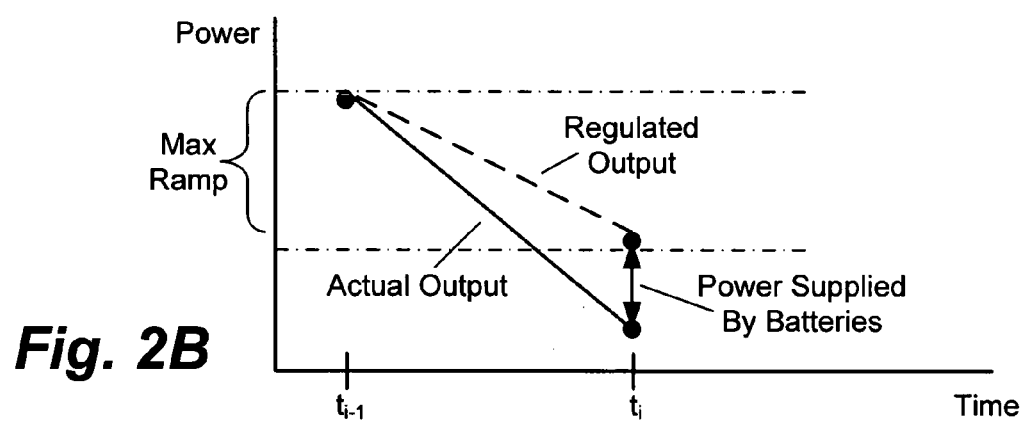
Figure 2C:
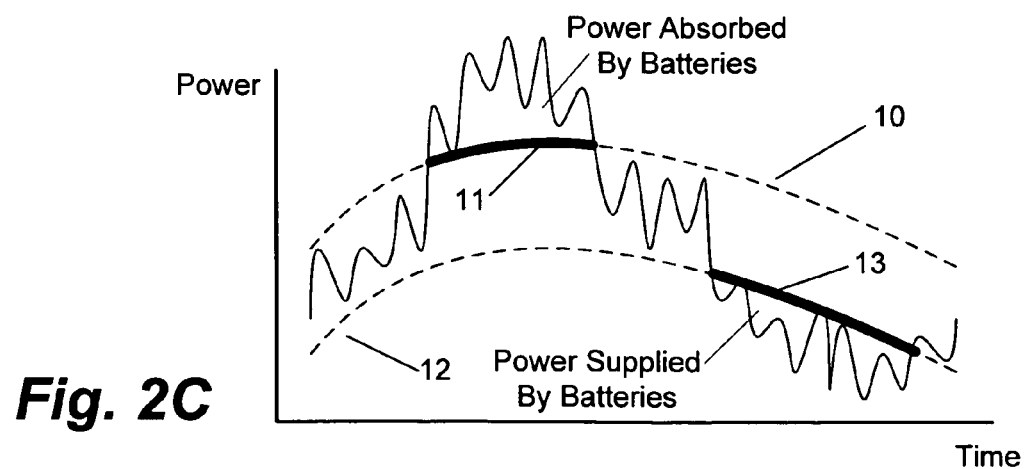

The effect achieved by combining an energy storage device, such as batteries, with the solar panels is illustrated in the time plots of FIGS. 2A-2C. FIG. 2A depicts the situation where the instantaneous increase in the output power of the solar panels over a period from $t_{i-1}$ to $t_i$ is greater than the maximum acceptable ramp rate. In this case, the battery storage system is activated to charge the batteries, which causes some of the output power from the solar panels to be absorbed by the batteries. As a result, the net output power to the grid during this time period remains within the acceptable ramp rate.

FIG. 2B illustrates the converse situation, in which the output power from the solar panels falls at a rate that exceeds the maximum acceptable rate. In this case, the batteries discharge to supply additional power to the grid during the time period, so that the net change from the prior period is reduced, and thereby remains within the allowable rate of change.

In the example of FIG. 2C, a desired band for the power over the course of a day is defined by upper and lower limits 10 and 12, which vary in accordance with the time of day. When the actual output power of the solar panels exceeds the upper limit during part of the day, the excess power is absorbed by the batteries, so that the net power supplied to the grid is limited to the amount depicted by the bold line segment 11. Similarly, when the output power from the solar panels falls below the limit 12 during a later part of the day, the batteries supply additional power to the grid, so that the net power delivered is at the level depicted by the bold line 13.

Figure 3:
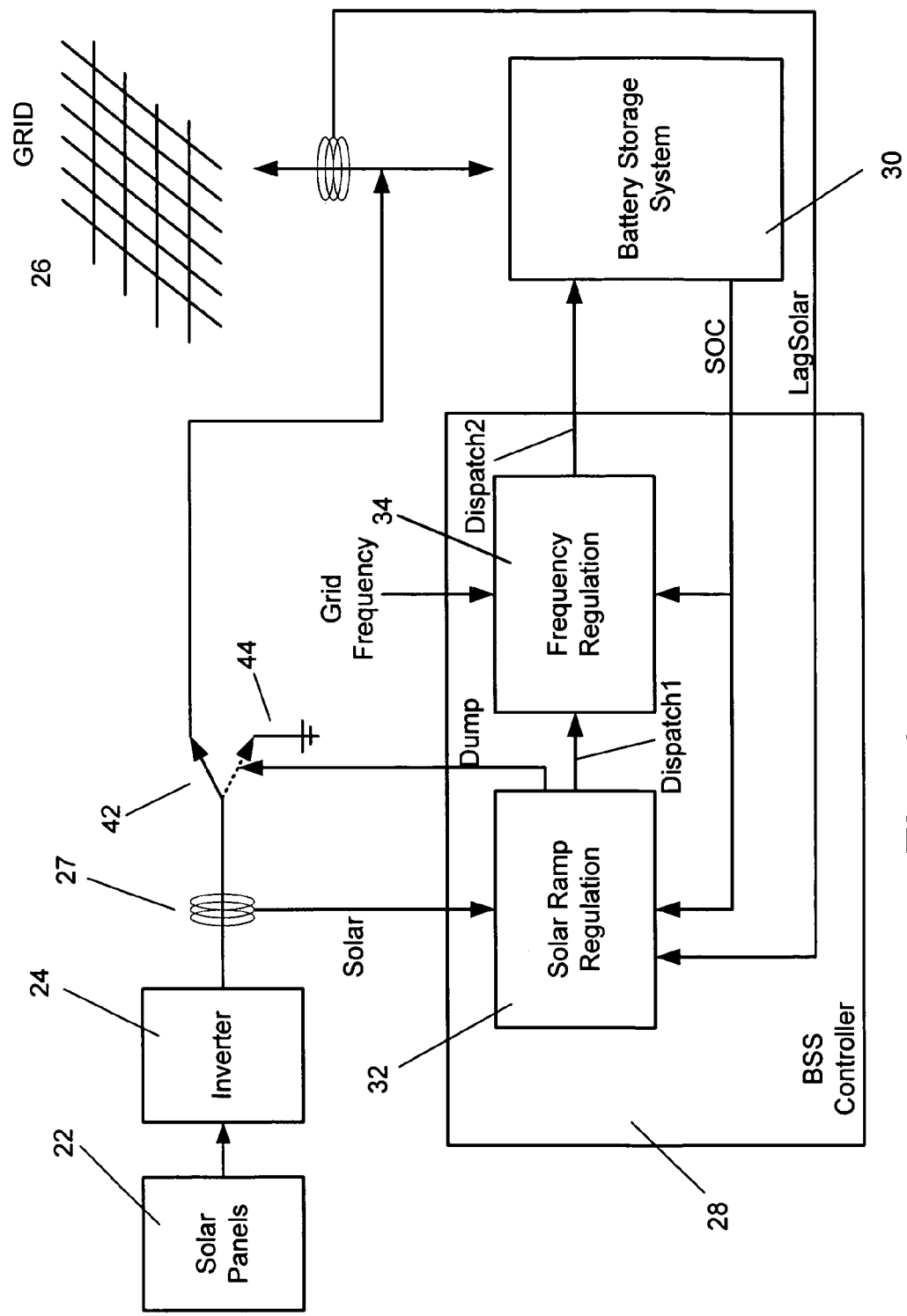
FIG. 3 is a general block diagram of an energy storage system connected to the power grid that is controlled to regulate, among other factors, the rate of change of output of a secondary energy source.

An example of a suitable energy storage system is one which employs a bank of batteries that are connected to the distribution grid and selectively charged or discharged, to absorb excess energy and provide supplemental energy, respectively. FIG. 3 is a block diagram illustrating an illustrative system for controlling the charging and discharging of storage batteries, and which implements the principles of the present invention. Referring thereto, one or more solar panels 22 produce direct-current output power that is converted into alternating-current (AC) power by an inverter 24. This AC power is supplied to an electric power distribution grid 26.

A sensor 27 provides a signal indicative of the output power of the solar panel inverter to a battery storage system controller 28. The controller generates a signal that effects charging or discharging of the batteries in a battery storage system (BSS) 30, which is connected to the grid 26. A first module 32 of the BSS controller 28 operates in accordance with the principles of the present invention to regulate the ramp, i.e. rate of change, of the output from the solar panels 22, as well as maintain its contribution to the grid within the desired band. This module generates a signal Dispatch1 in accordance with the instantaneous output power of the solar panel inverter to attenuate large and/or rapid swings, and regulate overall level, of that output power. In one embodiment of the invention, the output signal Dispatch1 from the solar power regulation module 32 can be directly applied to the BSS 30, to control the charging and discharging of the batteries according to the output of the solar panels.

In another embodiment, the signal Dispatch1 output from the solar power regulation module 32 is supplied to a frequency regulation module 34, as depicted in FIG. 3. The frequency regulation module 34 modifies the Dispatch1 signal in accordance with the frequency of the AC power on the grid 26. In essence, the frequency regulation module causes the BSS to supply power to, or absorb power from, the grid to maintain the operating frequency of the grid within a predetermined range that is based on a desired nominal operating frequency, e.g. 60 Hz in the United States. One example of such frequency regulation is described in commonly assigned patent application Ser. No. 12/248,106, now U.S. Pat. No. 7,839,027 issued on Nov. 23, 2010, the disclosure of which is incorporated herein by reference. As described therein, the amount, or rate, of energy transfer between the BSS and the grid can be a function of the operating frequency of the grid. The amount of discharge or charging of the batteries that is called for by the frequency regulation module is combined with the signal Dispatch1 from the solar power regulation module 32, to produce an output signal Dispatch2 that is applied to the BSS.

The sign of the control signal that is applied to the BSS, e.g. Dispatch1 in the first embodiment or Dispatch2 in the second embodiment, activates an inverter within a converter system (not shown) in the BSS to discharge the batteries onto the grid, or activates a converter within the converter system in the BSS to charge the batteries with power from the grid. The magnitude of the signal determines the amount of power to be added to, or absorbed from, the grid. Since the output power of the solar panel inverter 24 is applied to the connection between the BSS and the grid, the charging and discharging of the batteries effectively functions to absorb excess power from the solar panels, or supplement that power, respectively.

Figure 4:
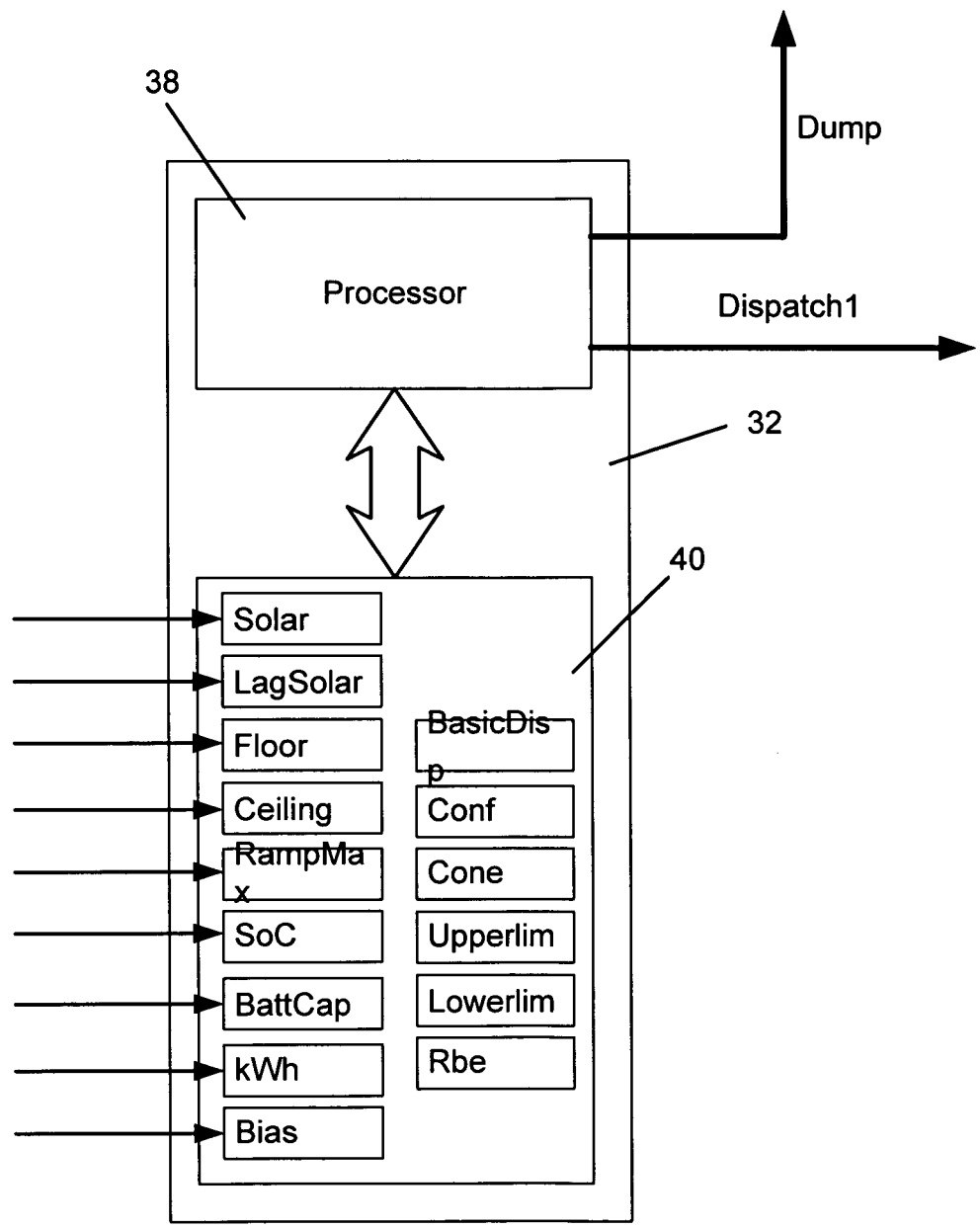
FIG. 4 is a more detailed block diagram of the control module for regulating the output power of a secondary energy source.

A more detailed depiction of the solar ramp regulation module 34 is illustrated in FIG. 4. The module includes a processor 38 that executes control algorithms described hereinafter, and one or more forms of memory 40 configured with registers that store the parameters employed by the algorithms. These parameters include the following set of input values having the indicated units of measurement:

Solar (kWh)—The output of the solar panel inverter at the current point in time, t.

LagSolar (kWh)—The regulated power output to the grid at time t−1, i.e. the algebraic combination of the outputs of the solar panels 22 and the batteries of the BSS 30.

Floor (kWh)—User-specified lower limit on power output, e.g. limit value 12.

Ceiling (kWh)—User-specified upper limit on power output, e.g. limit value 10.

RampMax (kWh)—User-specified maximum change, either up or down, in power output from time t−1 to t.

SoC (%, 0-100)—State of charge of the batteries.

BattCap (kWh)—Limit on instantaneous battery power output.

kWh (kWh)—Total battery energy capacity.

Bias (kWh)—User-defined value for an optimized state of charge of the batteries

The parameters stored in the memory 40 further include the following intermediate variables that are calculated by the algorithms:

BasicDisp (kWh)—Unconstrained battery dispatch signal.

Conf (kWh)—Constraint on charging the battery.

Cone (kWh)—Constraint on discharging the battery.

UpperLim (kWh)—Upper limit on acceptable range of power output to the grid.

LowerLim (kWh)—Lower limit on acceptable range of power output to the grid.

Rbe (%, 0-100)—Difference between current state of charge and full charge (=1−SoC).

As noted previously, the values for Floor and Ceiling are user-determined values that could be a function of temporal and/or geographic parameters that influence the expected output of a secondary source. In another embodiment, they could be determined as a function of the state of charge (SoC) of the batteries. Likewise, the value for RampMax is input by the user, and could be a function of any one or more of these same factors. The maximum rate of change could also be determined as a function of the output of the secondary source.

Based upon the data stored in these registers, the processor 38 produces two output signals, Dispatch1 and Dump. As described previously, in one embodiment the Dispatch1 signal can be directly applied to the BSS 30, to control the charging and discharging of the batteries. In an alternate embodiment, the Dispatch1 signal is supplied to the frequency regulation module, and modified as necessary to generate the Dispatch2 signal that controls the charging and discharging of the batteries.

The Dump signal is used to selectively discard the power generated by the solar panels when it is excessive and cannot be absorbed by the grid and the BSS. For instance, as figuratively depicted in FIG. 3, the Dump signal might activate a switch 42 to divert the solar power from the grid to an electrode 44 at ground potential.

Figure 5:
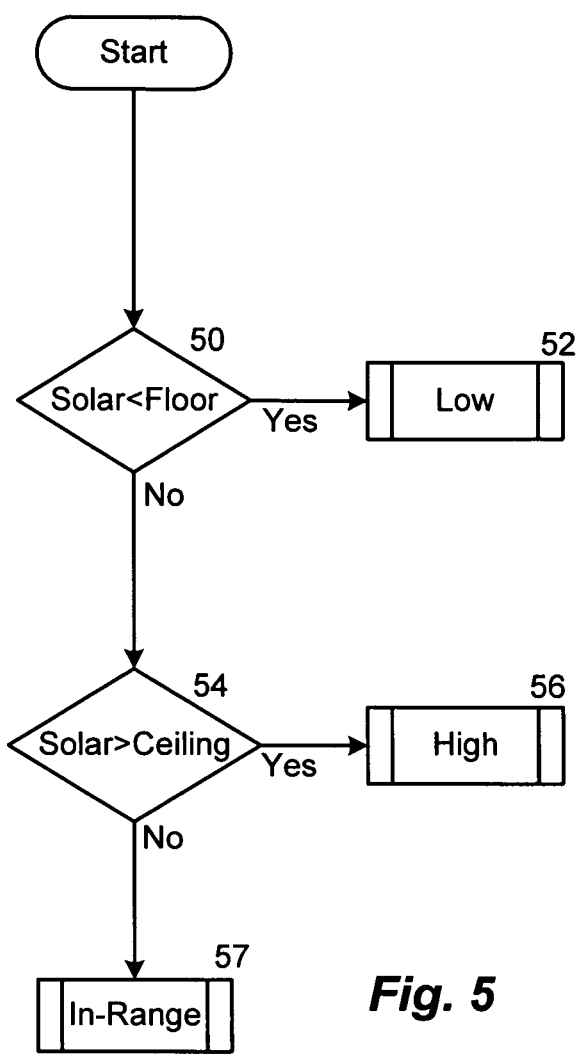
FIGS. 5, 6, 7 and 8A-8B are flowcharts illustrating a method of controlling an energy storage system to regulate the rate of change of the output of a secondary energy source.

The algorithms executed by the processor 38 to generate these signals are represented in the flow charts of FIGS. 5-8B. FIG. 5 illustrates the main routine that is performed on a periodic basis, e.g. once per second. At the start of the period, the current value of Solar is compared to the lower limit Floor, at step 50. If Solar is less than Floor, a discharge subroutine, Low, is executed at step 52. If the value for Solar is greater than Floor, the processor moves to step 54, where it compares the value for Solar to the upper limit Ceiling. If Solar exceeds Ceiling, a charge subroutine, High, is executed at step 56. If Solar is less than Ceiling, the processor executes an in-range subroutine at step 57.

Figure 6:
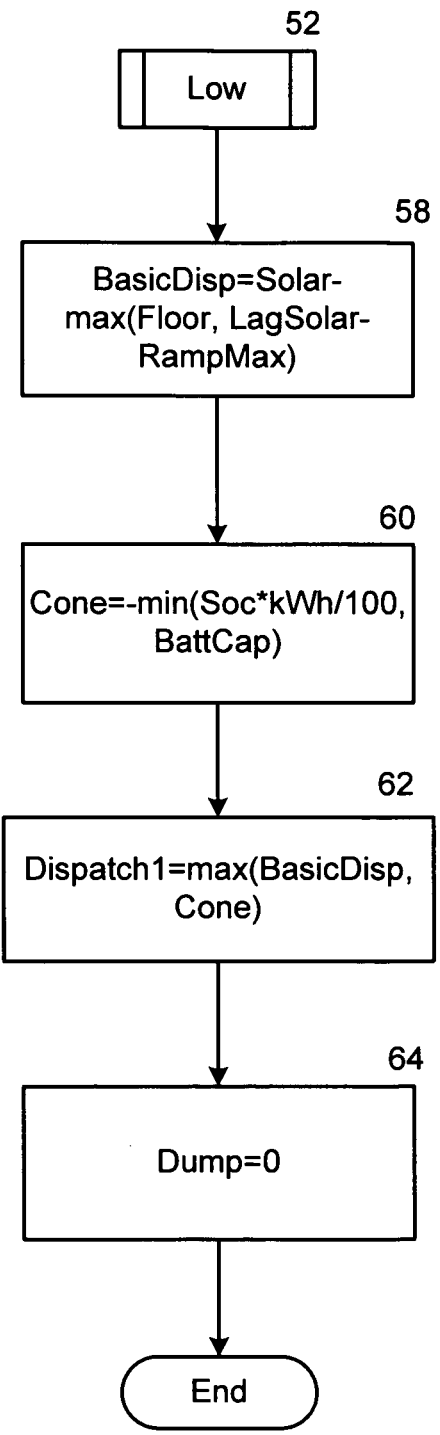

The discharge subroutine of step 52 is depicted in the flow chart of FIG. 6. When the processor jumps to this subroutine, at step 58 it sets the value of the unconstrained battery discharge signal BasicDisp to be equal to the value of Solar, minus the greater of either Floor or (LagSolar minus RampMax). LagSolar is the combined output of the solar panels and the BSS at time t−1. (LagSolar−RampMax) is the minimum acceptable output, from a rate-of-change perspective. If LagSolar is above, but close to, the floor value, then (LagSolar−RampMax) may cause the new output to fall below the floor value. In this case the "max" function ensures that the new (unconstrained) target output is at least at the floor value. This will be a negative value because the floor value is higher than the inverter output and the batteries will have to discharge power to the grid to make up the difference.

The negative value of BasicDisp is essentially a request to discharge the batteries, in order to raise system output above the floor level. However, the total discharge amount must not exceed the available energy in the batteries, or the batteries' maximum power rating. Therefore, at step 60 the parameter Cone is set to be equal to the negative of the lesser of (SoC*kWh/100) or BattCap. The overall value is negative because this is a discharge constraint.

At step 62, the greater of the unconstrained dispatch value BasicDisp and the constraint value Cone is selected, to produce the Dispatch1 control signal. Since, in this subroutine, the batteries are being discharged, there is no excess energy to be dumped. Accordingly, at step 64 the Dump control signal is set to 0.

Figure 7:
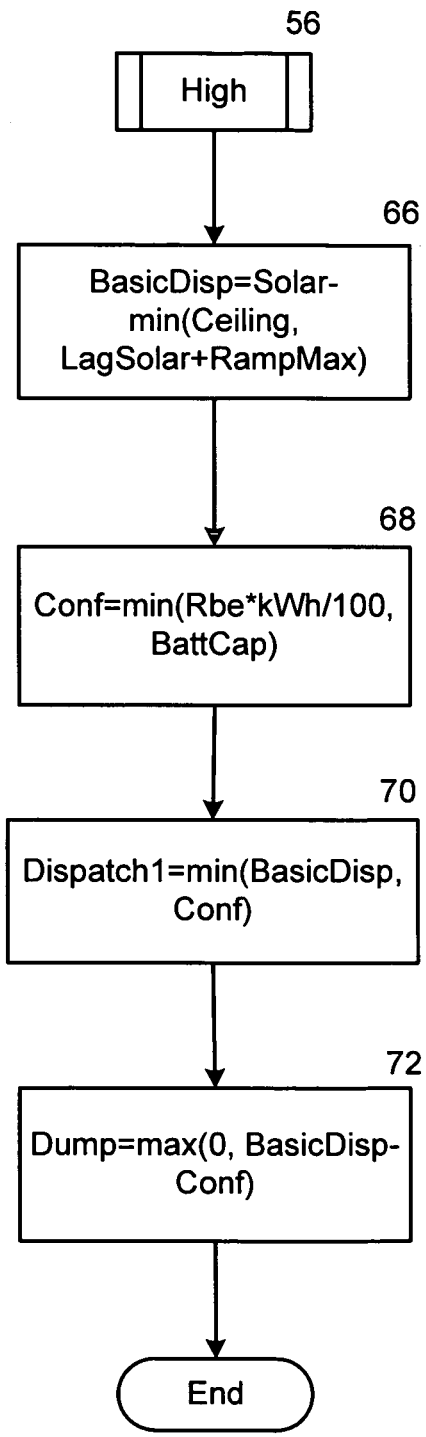

The flowchart of FIG. 7 depicts the charge subroutine 56 that is used to control the BSS when the solar inverter output rises above a user-specified ceiling. At step 66, the value for BasicDisp is set to be equal to the value of Solar minus the lesser of Ceiling and (LagSolar+RampMax). The maximum acceptable output from a slope perspective is defined by (LagSolar+RampMax). If LagSolar is close to the upper limit, then (LagSolar+RampMax) may cause the new output to go above the ceiling. In this case, the "min" function ensures that the new (unconstrained) target value is at most equal to the ceiling value. This will be a positive value because the inverter output is higher than the ceiling value and the batteries will have to charge (absorb energy) to reduce the output.

Any charge signal must not exceed the unused energy capacity of the batteries, or the batteries' maximum power rating. Therefore, at step 68, the lesser of (Rbe*kWh/100) and BattCap is selected to produce the charging constraint Conf.

At step 70, the lower of the unconstrained dispatch BasicDisp and the constraint Conf, both of which are positive values, is selected to produce the dispatch amount control signal Dispatch1. If the constraint is binding, then there is too much output from the inverter 24 for the batteries to handle, either because they are close to full charge or because of their maximum power rating. In this case, some output from the inverter must be dumped so that the net output to the grid stays within limits. Accordingly, at step 72 the Dump control signal is set to be the greater of zero or (BasicDisp−Conf).

Figure 8A:
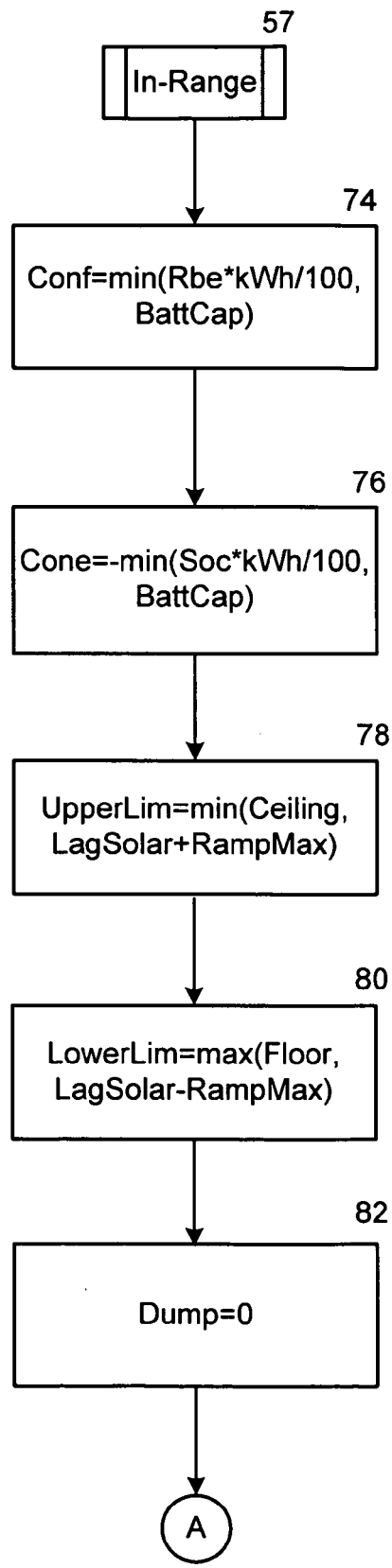
Figure 8B:
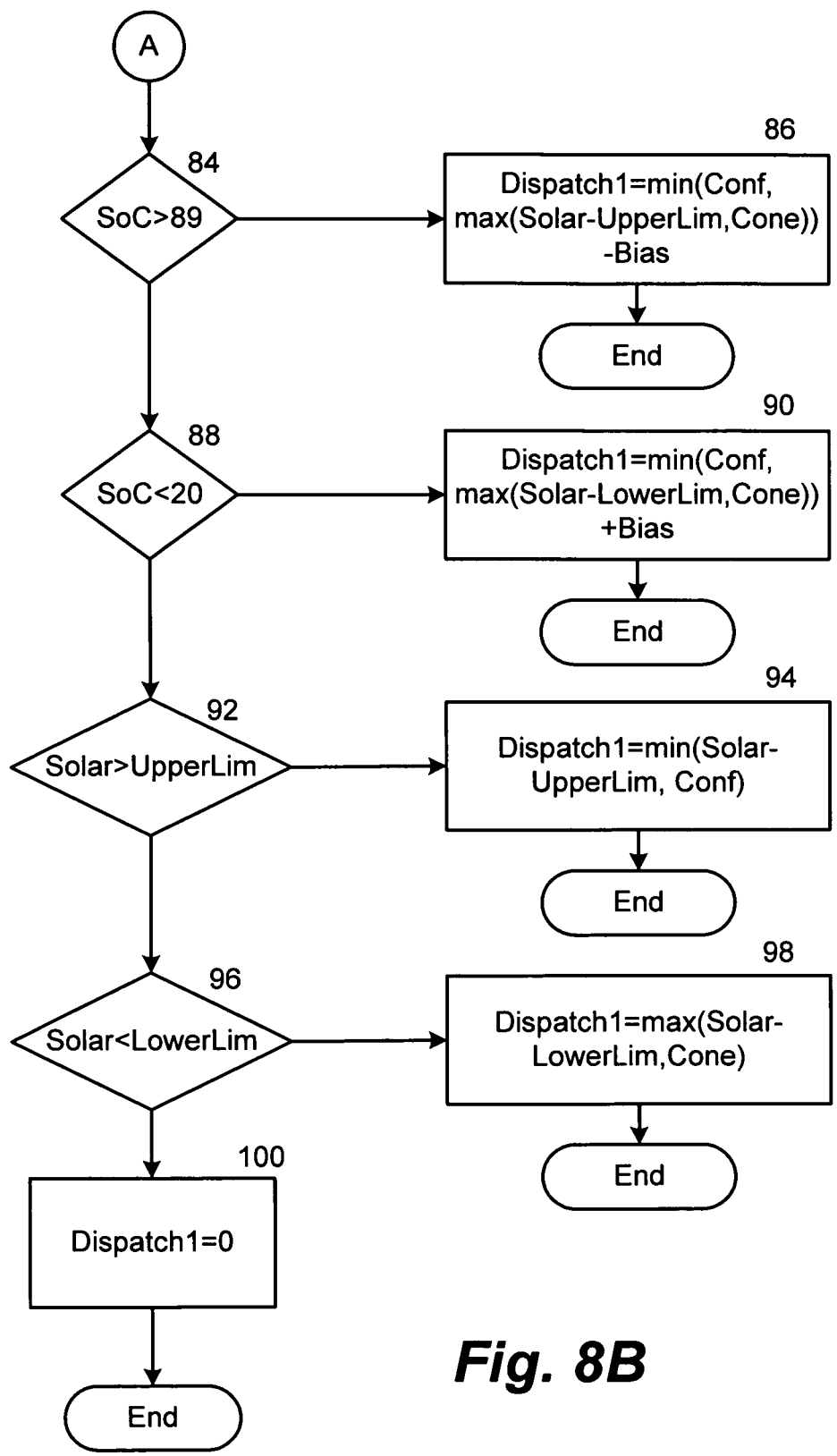

The flowchart of FIGS. 8A and 8B show the subroutine 57 that is used by the processor to control the system when output of the inverter 24 is in an acceptable range between the ceiling and the floor values. This is likely to be the case the majority of the time. During this time, the state of charge of the batteries is maintained at an optimum level, so as to be ready to accommodate the next peak or valley in the output of the solar panels.

At step 74, the charging constraint Conf is set. Since this is a charging constraint, it has a positive value. Any charge signal must not exceed the unused energy capacity of the batteries, or the batteries' maximum power rating. Therefore, the lesser of (Rbe*kWh/100) and BattCap is selected, to produce Conf.

At step 76, the discharging constraint Cone is set. Since this is a discharge constraint, it has a negative value. Any discharge signal must not exceed the available energy in the batteries, or the batteries' maximum power rating. Accordingly, Cone is set to be equal to the lesser of (SoC*kWh/100) and BattCap.

The acceptable upper limit on system output is the system output in the previous time period plus the maximum ramp rate, limited by the ceiling. At step 78, the upper limit value UpperLim is set to be equal to the lesser of Ceiling and (LagSolar+RampMax). The acceptable lower limit on system output is the system output in the previous time period minus the maximum ramp rate, limited by the floor. At step 80, the lower limit value LowerLim is set equal to the greater of Floor and (LagSolar−RampMax). Since the values for Ceiling and Floor can be functions of temporal factors, UpperLim and LowerLim can also be functions of these factors.

Since the system output is not likely to exceed the ceiling there is no need to dump power. Accordingly, the control signal Dump is set equal to zero at step 82.

Referring now to FIG. 8B, at step 84 a check is made to see if the state of charge of the batteries is greater than a user-specified upper threshold, e.g. 89%. If so, then the batteries are nearing full charge, and the processor branches to step 86. In this step, the control signal Dispatch1 is biased toward the upper limit in order to maximize the discharge (or minimize the charge). The basic unconstrained dispatch is Solar−UpperLim. If Solar>UpperLim, then the dispatch is a charge signal, and is constrained by the charging constraint Conf. If Solar<UpperLim, then the dispatch is a discharge signal, and it is constrained by the discharge constraint Cone. The so-constrained value is reduced by the user-supplied value for Bias, and output as Dispatch1.

If the state of charge is less than the upper threshold, a check is made at step 88 to see if the state of charge of the batteries is less than a user-specified lower threshold, e.g. 20%. If so, then the batteries are nearing discharge, and the processor branches to step 90. In this case the control signal Dispatch1 is biased toward the lower limit in order to maximize the charge (or minimize the discharge). The basic unconstrained dispatch is Solar−Lowerlim. If Solar<Lowerlim, then the dispatch is a discharge signal, and it is constrained by the value of Cone. If Solar>Lowerlim, then the dispatch is a charge signal, and is constrained by Conf. The so-constrained value is added to value for Bias, which becomes Dispatch1.

At step 92, a determination is made whether Solar>UpperLim. If so, then a charge signal, Solar−UpperLim, constrained by Conf, is sent at step 94. If Solar is not greater than UpperLim, a determination is made in step 96 whether Solar<LowerLim. If so, then a discharge signal, Solar−LowerLim, constrained by Cone, is sent at step 98. If none of the conditions of steps 84, 88, 92 or 96 is met, then no regulation is necessary, and the control signal Dispatch1 is set to zero at step 100.

It will be understood that the present invention as described above can be implemented in the form of control logic using hardware and/or using computer software in a modular or integrated manner. Based on the disclosure and teachings provided herein, a person of ordinary skill in the art will understand and appreciate other approaches to implement the present invention using hardware and a combination of hardware and software. For instance, in the example of FIG. 4 the ramp regulation module is depicted as having its own processor. In practice, the processor that implements the logic of FIGS. 5-8B may be part of a larger system, e.g. one that operates the entire BSS controller 28, and executes other routines in addition to those depicted in the flowcharts.

Any of the software components or functions described herein may be implemented as software code to be executed by a processor using any suitable computer language such as, for example, Java, C++ or Perl based upon, for example, conventional or object-oriented techniques. The software code may be stored as a series of instructions, or commands on a computer readable medium for storage, such suitable media including random access memory (RAM), read only memory (ROM), a magnetic medium such as a hard-drive or a floppy disk, or an optical medium such as a compact disk (CD) or DVD (digital versatile disk), flash memory, and the like. The computer readable medium may be any combination of such storage devices.

The above description of exemplary embodiments have been presented for the purposes of illustration and description. It will be appreciated that the principles underlying the invention can be implemented in other ways without departing from their essential characteristics. For example, while the exemplary embodiments have been described with respect to the use of solar panels as a secondary source of power, it will be appreciated that the invention can be employed with any other type of power source, particularly those having variable outputs, such as windmills. Likewise, energy storage media other than batteries, such as capacitive systems, flywheels or compressed air, can be employed to regulate the output power from the secondary source. Also, while a preferred power band having both upper and lower limits has been described for regulating the output power, the invention can be employed in systems that have only one limit, e.g. a floor value with no upper limit to the acceptable range of power. The maximum ramp rate could also be asymmetrical with a different allowable change in power when the output is rising than when it is decreasing.

Accordingly, the foregoing exemplary embodiments are not intended to be exhaustive nor to limit the invention to the precise form described, and many modifications and variations are possible in light of the foregoing teachings. The embodiments are described to explain the principles of the invention and its practical applications to thereby enable others skilled in the art to utilize the invention in various embodiments and with various modifications as are suited to the particular use contemplated.

What is claimed is:

1. A method of regulating an output power of a source of electricity that is supplied to an electricity distribution grid, the method comprising:
   determining whether:
   (a) the output power of the electricity source is outside a predetermined range, and
   (b) a rate of change of the output power exceeds a pre-defined maximum value that is a function of one or more parameters that influence an expected output of the electricity source, wherein the one or more parameters is selected from the list consisting of:
   a charging constraint on charging an energy storage medium, wherein the charging constraint limits charging of the energy storage medium based on unused energy storage capacity of the energy storage medium and a maximum power rating of the energy storage medium, and
   a discharging constraint on discharging the energy storage medium, wherein the discharging constraint limits discharging of the energy storage medium based on available energy storage capacity of the energy storage medium and the maximum power rating of the energy storage medium; and
   in response to determining that either or both of conditions (a) and (b) is met, regulating the output power supplied to the grid by transferring energy between the energy storage medium and the electricity grid,
wherein the transferring comprises discharging or charging the energy storage medium.

2. The method of claim 1, wherein said predetermined range is defined by a lower limit value, and wherein, in response to determining that the output power of the electricity source is less than said lower limit value, transferring energy from the energy storage medium to the electricity grid by discharging or charging the energy storage medium.

3. The method of claim 2, further comprising constraining the amount of energy transferred from the energy storage medium to the electricity grid in accordance with the predefined maximum value for the rate of change.

4. The method of claim 3, wherein the amount of energy transferred from the energy storage medium to the electricity grid is further constrained in accordance with the lesser of the state of charge of the energy storage medium and the maximum power rating of the energy storage medium.

5. The method of claim 2, wherein said predetermined range is further defined by an upper limit value, and wherein, in response to determining that the output power of the electricity source is greater than said upper limit value, transferring energy from the electricity grid to the energy storage medium by charging the energy storage medium.

6. The method of claim 5, further comprising constraining the amount of energy transferred to the energy storage medium from the electricity grid in accordance with the predefined maximum value for the rate of change.

7. The method of claim 6, wherein the amount of energy transferred to the energy storage medium from the electricity grid is further constrained in accordance with the lesser of the unused capacity of the energy storage medium and the maximum power rating of the energy storage medium.

8. The method of claim 1, wherein the predetermined range is a function of a temporal factor.

9. The method of claim 1, wherein the predetermined range is a function of a geographic parameter that influences the output of the electricity source.

10. The method of claim 1, wherein the predetermined range is a function of the state of charge of the energy storage medium.

11. The method of claim 1, wherein the one or more parameters include a temporal factor.

12. The method of claim 1, wherein the one or more parameters include a geographic parameter that influences the output of the electricity source.

13. The method of claim 1, wherein the predetermined maximum rate of change is a function of the output of the electricity source.

14. The method of claim 1, wherein the predetermined maximum rate of change is a function of the state of charge of the energy storage medium.

15. The method of claim 1 further comprising:
in response to determining that neither of conditions (a) or (b) is met:
determining whether a state of charge (SoC) of the energy storage medium is within predetermined thresholds; and
in response to determining that the SoC of the energy storage medium is outside said predetermined thresholds, transferring energy between the energy storage medium and the electricity grid to bring the SoC within said predetermined limits.

16. The method of claim 15, wherein transferring energy between the energy storage medium and the electricity grid to bring the SOC within said predetermined thresholds comprises:
defining an upper value and a lower value for transferring energy between the energy storage medium and the electricity grid, each of which is based upon a most recent amount of electricity being supplied to the electricity grid and the maximum value for the rate of change;
determining whether the output power of the electricity source is greater than the upper value, and;
in response to determining that the output power of the electricity source is greater than the upper value, transferring energy from the electricity grid to the energy storage medium by charging the energy storage medium.

17. The method of claim 16, further comprising:
in response to determining that the output power of the electricity source is not greater than the upper value, determining whether the output power of the electricity source is less than the lower value;
in response to determining that the output power of the electricity source is less than the lower value, transferring energy to the electricity grid from the energy storage medium; and
constraining the amount of energy transferred from the energy storage medium to the electricity grid in accordance with the lesser of the state of charge of the energy storage medium and the maximum power rating of the energy storage medium.

18. The method of claim 16, further comprising constraining the amount of energy transferred to the energy storage medium from the electricity grid in accordance with the lesser of the unused capacity of the energy storage medium and the maximum power rating of the energy storage medium.

19. The method of claim 15, wherein the predetermined thresholds are a function of a temporal factor.

20. A system for regulating an output power of a source of electricity that is supplied to an electricity distribution grid, comprising:
at least one energy storage medium;
a converter system that, in response to receiving a command to add energy to or absorb energy from the grid, is configured to selectively couple said at least one storage medium to the grid to transfer energy between the at least one storage medium and the grid; and
a power regulating system configured to:
determine whether:
(a) the output power of the electricity source is outside a predetermined range, and
(b) the rate of change of the output power exceeds a predefined maximum value that is a function of one or more parameters that influence an expected output of the electricity source, wherein the one or more parameters is selected from the list consisting of:
a charging constraint on charging the energy storage medium, wherein the charging constraint limits charging of the energy storage medium based on unused energy storage capacity of the energy storage medium and a maximum power rating of the energy storage medium, and
a discharging constraint on discharging the energy storage medium, wherein the discharging constraint limits discharging of the energy storage medium based on available energy storage capacity of the energy storage medium and the maximum power rating of the energy storage medium; and control said converter system by transferring energy between the energy storage medium and the electricity grid in response to determining that either or both of conditions (a) and (b) is met, wherein the transferring comprises discharging or charging the energy storage medium.

21. The system of claim 20, wherein said power regulating system further includes a frequency regulating system configured to:

determine whether the operating frequency of the electricity grid is within a predetermined range of a nominal operating frequency; and control said converter system to transfer energy between the at least one energy storage medium and the electricity grid to bring the operating frequency within said range.

22. The system of claim 21, wherein the transferring a function of the operating frequency of the electricity grid.

* * * * *